United States Patent Office 3,143,405
Patented Aug. 4, 1964

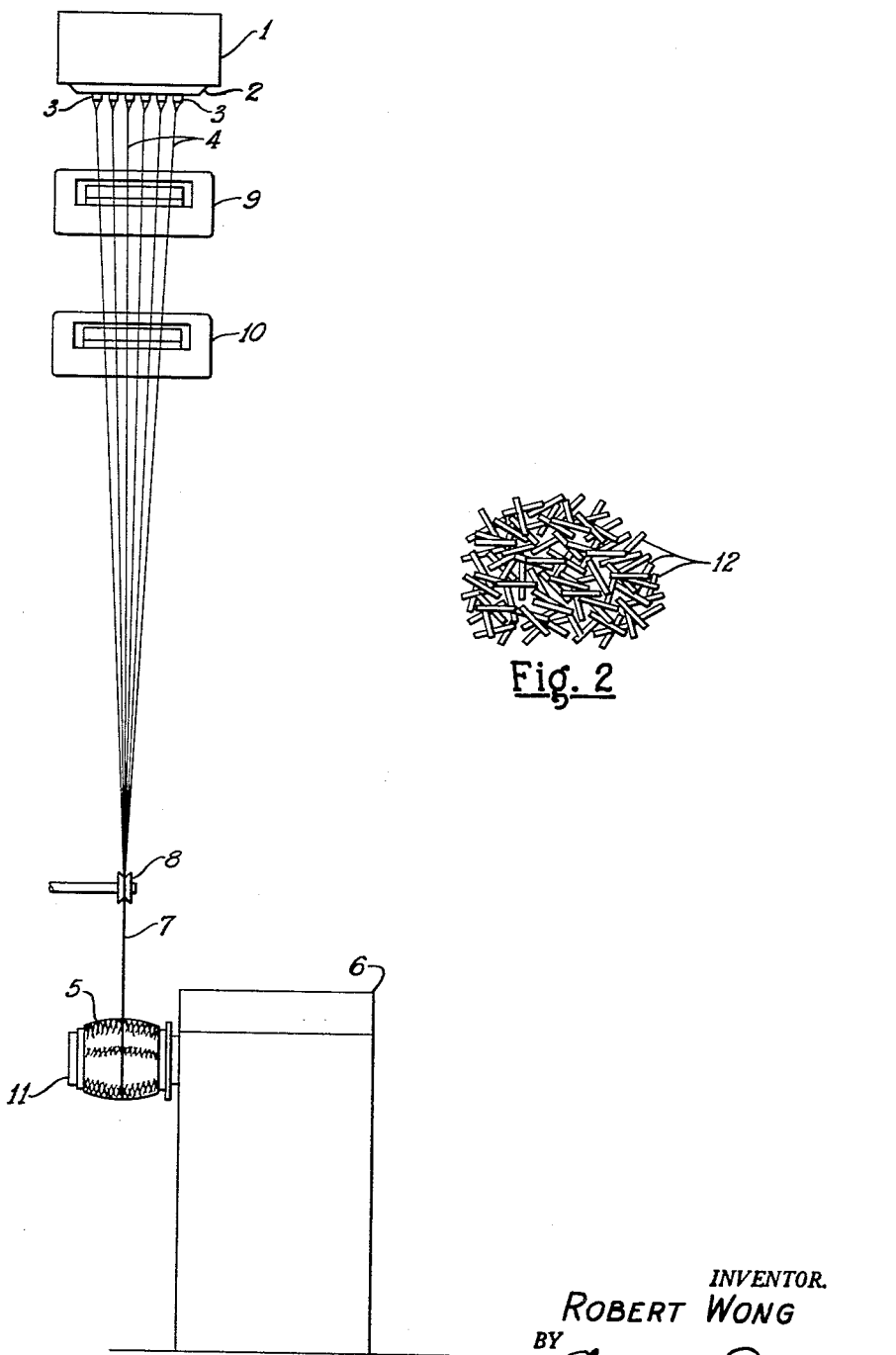

3,143,405
METHOD OF PRODUCING POLYAMIDE COATED
GLASS FIBERS
Robert Wong, Newark, Ohio, assignor to Owens-Corning
Fiberglas Corporation, a corporation of Delaware
Filed Nov. 3, 1960, Ser. No. 67,090
5 Claims. (Cl. 65—3)

The present invention relates to methods and materials for the coating of fibrous glass and particularly to methods for the in situ formation of a polyamide resin coating upon glass fibers during their formation by attenuation.

Glass fibers or filaments are conventionally formed by means of the high speed attenuation of molten glass. In the commercial production of continuous glass filaments, the molten glass is continuously flowed through a plurality of orifices and concurrently attenuated and wound in a package form by means of a high speed rotary winder which is positioned adjacent to the fiber forming apparatus. The attenuation and winding of filaments formed in this manner is normally conducted at a speed in excess of 4000 feet per minute and preferably at a speed of approximately 10,000 feet per minute.

Due to the qualities of mutual abrasion and limited flexibility which are inherent in glass fibers, the application of a size or coating composition to the surfaces of the fibers immediately subsequent to their formation is necessitated. This forming size may function both as a protective coating and as an intermediate stratum which is operative during subsequent processing. However, the function of protective coating in which a film-forming material which may optionally contain additives such as lubricants, coupling agents, emulsifiers, plasticizers and the like, is employed to provide a protective sheath above the glass filaments, is essential. In the absence of this protective medium, the individual fibers and strands or yarns formed therefrom are rendered valueless by attrition resulting from mutual abrasion experienced during the basic processing of the glass fibers such as winding, twisting and strand and yarn formation. The second and optional function of providing an intermediate or substratum operative during advanced processing, may comprise compatibility with subsequently applied coatings or matrices or lubricity and stand integrity during weaving wherein the yarn must easily pass through the weaving apparatus and must not exhibit excessive "fuzz" or broken filament ends, in order to serve as a weavable material.

In the selection of the film-forming ingredient of the forming size, synthetic resins have gained extensive popularity due to their flexibility and their ability to provide a continuous and relatively impermeable film.

Resins of obvious suitability for this type of application are the linear polyamides which could impart lubricity to glass fibers coated therewith while simultaneously providing the necessary protective sheath or coating. Such lubricity provides a twofold improvement in that it serves to reduce attrition in combatting the quality of mutual abrasion inherent in glass fibers and by further providing lubricity in materials which can be formed from the polyamide coated fibers such as fibrous glass reinforced bearing structures or surfaces, gears or structures formed from a molding compound comprising polyamide glass filaments.

However, the utilization of polyamide coatings upon glass fibers has encountered a series of seemingly insurmountable impediments which have to date prohibited the adaptation of this technique and base material.

In order to produce an economically feasible resin coated fibrous glass material, the resin must be applied to the filaments during their high speed formation by attenuation. This situation greatly diminishes the scope of materials which may be employed due to the conflict imposed by the inherent characteristics of both the forming process and the synthetic resins or resin systems. For example, in the choice of the resin form or system which is to be applied, three obvious alternatives present themselves in the form of solvent solutions of the resin, hot melt applications and in situ formation of the resin by means of the polymerization or reaction of the base reagents which go to make up the resin. However, none of these techniques are truely compatible with the high speed forming method wherein the treating period and the distance between the size composition applicator which is positioned immediately adjacent to the fiber forming bushing, and the package former or rotary winder, normally ranges between .018 and .06 second and 3 to 10 feet. In order to provide a curing or treating period of 30 seconds between coating and winding, the winding apparatus would of necessity be positioned 5,000 feet from the coating applicator.

The primary drawback entailed in the application of solvent resin systems, e.g., alcohol solutions of polyamide resins, to glass fibers during forming, lies in the difficulty in removing or flashing off the solvents employed before the individual fibers or a plurality of fibers grouped into a strand formation, are wound into a package form. If the solvents are not removed prior to the formation of the package, the package is bonded or cemented into an integral structure from which the fibers or strands may not be individually withdrawn since drying or curing is not accomplished until the fibrous glass has assumed the integral or coextensive form of the wound package. While it appears that the utilization of the heating step to remove the solvent is called for, this expedient is parried by the fact that only a fraction of a second is allowed for this treatment and because an extension of the treating period would necessitate an oven or similar heating apparatus measuring thousands of feet in length.

The same basic drawback or package bonding is true in regard to the utilization of hot melt coating techniques since an adequate period for the cooling or setting of the molten resin is not available.

The unfeasibility of in situ formation or polymerization of the resin upon the glass fibers during the forming phase is even more pronounced in that such preparations normally require reaction periods measured in hours and elevated temperatures throughout the lengthy reaction phase.

Thus, despite the desirability of polyamide coated fibrous glass, the incompatible characteristics of both the glass fibers and available resins and resin systems have to date precluded the preparation of polyamide coated fibrous glass structures in all forms except highly specialized products obtained by costly impregnation techniques which are impractical for widespread commercial adaptation.

It is an object of the present invention to provide a method for applying a polyamide resin coating to glass fibers during their formation by attenuation.

A further object is the attainment of the polyamide coating by means of an in situ polymerization of the resin.

Another object is the provision of glass fibers coated with a polyamide resin which is applied during the formation of the glass fibers.

The aforegoing objects are achieved by the invention by means of the two step and separate application of two highly reactive intermediates which are applied to the glass fibers during their formation and while the fibers are traveling at conventional production forming speeds. In this method, a polyamine and a dicarboxylic acid halide are separately applied and reacted to immediately provide a polyamide coating which is at least partially polymerized.

The method of application is best described in relation to the drawing which depicts a schematic representation of conventional apparatus employed to form glass fibers and coating apparatus utilized to effect the methods of the invention and to apply the coating materials of the invention.

Referring to the drawing, the glass fibers are formed from molten glass contained within the heated bushing 1 which is provided with a bushing tip section 2 containing bushing tips 3, each of which contains an orifice through which the molten glass is flowed. As the glass flows through these orifices, it is formed into filaments 4 which are attenuated and wound into a package 5 by means of a rotary winder 6 which is positioned beneath the bushing.

While the drawing depicts the simultaneous and continuous formation of only six fibers, any number of fibers from one to several hundred may be produced according to the number of bushing tips 3 and orifices which are provided in the bushing tip section 2. When a plurality of fibers are simultaneously formed, they are normally grouped into a strand formation 7 by means of a guide member 8 which is depicted in the drawing as a grooved wheel, but which may be a guide eye or similar conventional grouping member.

In applying the coatings of the invention, a first applicator 9, here illustrated as a roller type applicator such as that disclosed by U.S. 2,693,429 and 2,742,737 is positioned beneath the bushing 1. Either the polyamine or the dicarboxylic acid halide may be applied at the first applicator 9 and the other of the two materials is then applied by a second applicator 10 which is located a short distance beneath the first applicator 9. The spacing of the two applicators 9 and 10 is not critical except within the limits of the distance between the bushing tips 3 and the winder 6, which normally ranges between 3 and 10 feet. In order to provide the longest curing or treating period possible, it is advisable to locate both applicators as near as possible to the bushing tips 3.

In practice, it has been found that a preferred arrangement involves positioning the first applicator 9 between 4 and 12 inches beneath the bushing tips 3 and the second applicator 10 between 4 and 12 inches beneath the first applicator 9. In applying the two coating materials to the glass fibers, applicators other than the roller type which are depicted may be employed. For example, one may utilize any conventional contact spray or immersion technique such as the pad type applicators disclosed in U.S. 2,390,370 and 2,778,764; spray or jet applicators as disclosed in U.S. 2,491,889 and 2,906,470; apron type applicators as disclosed in U.S. 2,873,718 or immersion apparatus as disclosed by U.S. 2,732,883.

By means of the methods of the invention, the fibers 4 and strand 7 which are traveling at speeds in excess of 4,000 feet per minute and normally at a speed of approximately 10,000 feet per minute are provided with a dual coating of two highly active intermediates which attain a state of at least partial polymerization prior to being wound in the form of a package. While it is difficult to determine the degree of polymerization attained, the presence of a protective coating upon the fibers and the fact that the fibers may be readily removed from the wound package, indicate that polymerization has proceeded beyond the tacky or cohesive stage and to a point at which commercial processing and handling is possible. The polymerization may also be accelerated by the residual heat of the fibers although such heat rapidly diminishes during transit from the bushing 1 to the package 5.

The highly reactive intermediates have heretofore been described as polyamines and dicarboxylic acid halides. These materials are preferably employed with immiscible solvents and achieve an unusually fast and substantially spontaneous reaction as illustrated below:

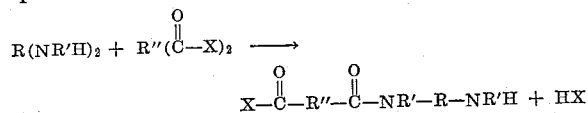

wherein X is halogen, R' is hydrogen or a mono-valent hydrocarbon radical, R is a divalent hydrocarbon radical and R" is a divalent hydrocarbon radical or a cyclic structure. Two molecules of the condensate thus obtained then react and their reaction product further reacts with similar products to eventually yield a long chain polymer.

While adipyl chloride provides a preferred reactant, other aliphatic and aromatic dicarboxylic acid halides such as the halides of malonic, succinic, glutaric, pimelic, suberic, azelaic, sebacic, phthalic, isophthalic, terephthalic and naphthalic acids also can be employed.

The second or amino reactant is characterized by two reactive amino or alkyl amino groups and encompasses a large body of compounds. While hexamethylene diamine is a preferred reactant, other diamines and substituted diamines such as ethylene diamine 2-methyl hexamethylene diamine and 3-methyl hexamethylene diamine are also applicable. In addition, other polyamines possessing at least two reactive amino or alkyl amino groups such as diethylene triamine and triethylene tetramine may also be employed. In general, satisfactory reactants are those which satisfy the general formula: $R(NR'H_2)$ wherein R is a divalent hydrocarbon radical, and R' is hydrogen or a mono-valent hydrocarbon radical.

As previously stated, in a preferred embodiment the reactive intermediates are employed in a solvent system utilizing immiscible solvents. In addition to the preferred characteristic of immiscibility, it is essential that the solvents are inert to the reactive intermediate which they contain and less reactive toward the other reactive intermediate than the reactive intermediate which they contain. However, immiscible solvents or a nonsolvent or one solvent system may also be utilized. When a non-solvent or single solvent system is employed, the reactive intermediate employed without a solvent, should be a liquid under the reaction conditions in order to satisfy the conditions of application.

The amount of solvent employed for each of the reactants may be varied to achieve the degree of viscosity desirable for the application technique which is selected. The solvent for the dicarboxylic acid halide is preferably carbon tetrachloride. However, other halogen derivatives of hydrocarbons such as chloroform, trichloroethylene, ethylene dichloride and ethylene chlorobromide as well as benzene, benzene homologs or substituted benzene compounds such as xylene, toluene, chlorobenzene or nitrobenzene, alicyclic compounds such as cyclohexane, alkanes such as heptane or iso-octane and ketones, ethers and esters may also be utilized as solvents for the dicarboxylic acid halides.

While water may be employed as a solvent for the polyamine reactants for reasons of economy and because the acid halides are more reactive with the amines than with water, a solvent which is nonreactive with the acid halides may be preferred for increased efficiency in the reaction. Examples of such nonreactive solvents are ketones and ethers such as acetone, methyl ethyl ketone, methyl isobutyl ketone and ethyl ether. Other suitable solvents are organic hydroxy compounds such as alcohols or glycols.

Volatility, in addition to immiscibility and reactivity, may be consideration in the selection of the solvents employed. While not a critical condition, it is sometimes preferable to select solvents which reduce or eliminate the danger of fire when the coatings are applied in the vicinity of the high temperature fiber forming bushing. However, the superior operability of a volatile solvent may warrant the utilization of fume exhaust apparatus or similar safeguards.

The reaction of the coating constituents proceeds at room temperature although it is possible that the fibers contain some residual heat which may serve to accelerate the polymerization.

The following is an example of the conduct of the invention which was achieved with apparatus similar to that depicted in the attached drawing:

*Example*

Ten grams of hexamethylene diamine were dissolved in 90 grams of water and placed in the reservoir of the first applicator 9. A second solution comprising 10 grams of adipyl chloride in 90 grams of carbon tetrachloride was similarly placed in the second applicator 10. The fibers were drawn from the bushing 1 and in contact with the applicators 9 and 10 and were then attached to the rotating collet 11 of the winder 6 and attenuated and wound into the package 5 at a speed of 4,500 feet per minute.

The coated fibers were found to be readily removable from the wound package thus formed and did not exhibit tackiness or an interbonding while in the package form.

In addition, the package had a feel indicative of excellent qualities of lubricity which proves highly beneficial during processing such as winding, twisting, plying, weaving, postcoating, and the like, wherein attrition normally occasioned by the contact of the glass fibers with guide eyes or other contact points or with each other is eliminated or greatly diminished. Furthermore, the fibers possess a flexible and relatively tough or abrasion resistant coating which in combination with the aforementioned qualities of lubricity serves to substantially delete the usually extensive attrition which is experienced during processing.

An additional indication of product superiority was yielded by tensile strength data embodied in the following table wherein twenty fibers of equal length were removed from various portions of the wound tube or package prepared according to the example and subjected to a longitudinal force until broken.

| Fiber | Breaking Load (grams) | Breaking Stress (Pounds/Square inch) |
|---|---|---|
| 1 | 30 | 477,000 |
| 2 | 26 | 414,000 |
| 3 | 28 | 445,000 |
| 4 | 23 | 365,000 |
| 5 | 28 | 445,000 |
| 6 | 28 | 445,000 |
| 7 | 28 | 445,000 |
| 8 | 31 | 495,000 |
| 9 | 28 | 445,000 |
| 10 | 28 | 445,000 |
| 11 | 26.5 | 422,000 |
| 12 | 28 | 445,000 |
| 13 | 29 | 462,000 |
| 14 | 30 | 478,000 |
| 15 | 30.5 | 485,000 |
| 16 | 18 | 286,000 |
| 17 | 28 | 445,000 |
| 18 | 28 | 445,000 |
| 19 | 28 | 445,000 |
| 20 | 26 | 415,000 |
| Average | | 439,000 |

The first column in the table indicates the actual weight in grams which was suspended from the fiber before breaking occurred and the second column lists the tensile strength in pounds per square inch which was derived from this figure and the actual diameter of the fiber.

The true impact of the tensile strength determination is not evident unless compared with figures derived from similar tests conducted with uncoated fibers and with fibers provided with a conventional size or coating. For example, it has been determined that the tensile strength of uncoated glass fibers normally ranges between 225,000 and 330,000 pounds per square inch after undergoing winding into a package form, while fibers coated with a conventional forming size comprising an aqueous dispersion containing a film-forming material such as polyvinyl acetate, normally exhibit tensile strengths ranging between 210,000 and 350,000 pounds per square inch. It should be observed that the use of conventional size compositions often results in actual decreases in tensile strength which is possibly the result of the utilization of aqueous dispersions and the deleterious defects of water upon the fiber surfaces. These coatings per se are incapable of increasing the tensile strengths of fibers since their own inherent strengths are considerably less than those of the fibers. This is borne out by the fact that the amount of coating applied may be varied between 1 and 5% by weight of the fiber coating composite without effecting the tensile strengths of the fibers. In essence, the tensile strength determinations are a measurement or reflection of the protective qualities of the coatings, since they demonstrate the ability of the coating to counteract or obviate the effects of abrasion and chemical attack.

The previously mentioned sacrifice in tensile strength which is encountered when conventional size compositions are applied to the fibers, has previously been deemed the lesser of two evils in view of the reduction in attrition which is achieved by providing the fibers with an abrasion resistant protective resinous sheath. However, it should be noted that the tensile strengths of the glass fibers treated according to the present invention, demonstrate an improvement of between 25 and 110% over the strengths of uncoated or conventionally coated fibers.

It should be further noted that the improvement achieved by means of the invention cannot be completely demonstrated by the qualities exhibited by the coated glass fibers per se, but must be appraised in the perspective of ultimate products and processing improvements which are now made possible.

As previously mentioned, the enhanced lubricity of the polyamide coated fibers of the invention is a significant advance in the area of processing instigated attrition, which is normally experienced during the engagement of the fibers with processing contact points or with each other.

In addition, a variety of highly desirable products are made possible by the invention. Such products take the form of glass fiber reinforced polyamide structures which are in great demand in the areas of bearing, gear and general structural element formation. The popularity of such items is greatly enhanced by the lower dry friction, ease of machining and molding, low cost, and superior mechanical and abrasion resistant properties of the polyamide in comparison with other thermoplastic resins.

In preparing such reinforced structures, glass fibers may be provided at forming with a polyamide coating comprising 10 to 25% by weight of the coated fiber composite and utilized directly, without additional resin, as a molding compound. In such an application, the coated fibers are chopped into short lengths on the order of 3 inches and preferably of 1 inch or less, and thus formed a molding compound. Alternatively, the fibers can be provided at forming with a conventional resin coating or forming size, i.e., 1–5% by weight, and be subsequently impregnated with additional resin.

In addition, the polyamide coated fibers provide excellent base materials for use in ultimate products such as roving materials, tapes and woven goods. The roving materials thus formed provide excellent reinforcements for synthetic resins and particularly for polyamide resins and may be utilized in the form of continuous roving, chopped roving or as fabrics woven from roving. Tapes of this type are highly desirable and particularly beneficial in applications wherein the lubricity or low friction of polyamides is sought. Fabrics may also be easily woven from yarns formed from the polyamide coated fibers since the low friction characteristics of the coating provides for ease of handling in such processing.

The polyamide coatings may also serve in an adhesive or binder function since the coated fibers may be subjected to a relatively low temperature which is not harmful to the fibers themselves, in order to melt the polyamide resin which is later allowed to cool and thereby bond the fibers in the position or relationship existing at the time of cooling.

In addition, the polyamide coating with its excellent color receptivity may be pigmented or dyed to yield a broad spectrum of colors serving to enhance aesthetic characteristics and particularly desirable in the area of decorative fibrous glass fabrics.

The polyamide coatings of the invention may also be employed in combination with conventional size composition additives such as coupling agents, additional film-forming materials, plasticizers, emulsifiers, lubricants, pigments, fillers and the like.

It is apparent that the present invention provides new and unusual methods for the preparation of polyamide coated fibrous glass materials and for novel and highly desirable products formed by these methods.

It is also obvious that various changes, alterations and substitutions may be made in the compositions, methods and products of the present invention without departing from the spirit of the invention as defined by the following claims.

I claim:

1. A method for the in situ formation of the polyamide reaction product of a dicarboxylic acid halide reactant and a polyamine reactant upon the surfaces of glass fibers comprising attenuating fibers from a body of heat softened glass at a rate in excess of 4000 feet per minute, and during said attenuating, applying a first solution of one of said reactants to said surfaces, immediately superimposing a second solution of the other of said reactants upon said first solution, and immediately reacting said dicarboxylic acid halide and said polyamine to yield between 1 to 25% by weight of said polyamide reaction product.

2. A method as claimed in claim 1 in which said dicarboxylic acid halide is a compound having the formula

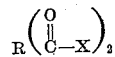

wherein X is halogen and R is a radical selected from the group consisting of divalent hydrocarbon and aryl radicals.

3. A method as claimed in claim 1 in which said polyamine is a diamine having the formula $R(NR'H)_2$ wherein R is a divalent hydrocarbon radical and R' is selected from the group consisting of a hydrogen atom and a monovalent hydrocarbon radical.

4. A method as claimed in claim 1 in which said dicarboxylic acid halide is adipyl chloride.

5. A method as claimed in claim 1 in which said polyamine is hexamethylene diamine.

References Cited in the file of this patent

UNITED STATES PATENTS

| | | |
|---|---|---|
| 2,207,158 | Neville et al. | July 9, 1940 |
| 2,260,024 | Hall et al. | Oct. 21, 1941 |
| 2,336,797 | Maxwell | Dec. 14, 1943 |
| 2,369,876 | Warren | Feb. 20, 1945 |
| 2,430,479 | Pratt et al. | Nov. 11, 1947 |
| 2,671,744 | Biefeld et al. | Mar. 9, 1954 |
| 2,708,617 | Magat et al. | May 17, 1955 |
| 2,723,208 | Morrison | Nov. 8, 1955 |
| 2,766,142 | Thomas | Oct. 9, 1956 |
| 2,767,519 | Bjorksten | Oct. 23, 1956 |
| 2,778,764 | Morrison | Jan. 22, 1957 |
| 2,820,021 | Franko-Filipasic | Jan. 14, 1958 |
| 2,831,834 | Magat | Apr. 22, 1958 |
| 2,838,418 | Starkweather | June 10, 1958 |
| 2,860,072 | Nischk et al. | Nov. 11, 1958 |
| 2,862,281 | Klausner | Dec. 2, 1958 |
| 2,867,891 | Horton et al. | Jan. 13, 1959 |
| 2,881,505 | Hoffman | Apr. 14, 1959 |
| 2,893,892 | Pinte et al. | July 7, 1959 |
| 2,929,737 | Tischbein | Mar. 22, 1960 |
| 2,936,487 | Paz | May 17, 1960 |
| 2,939,761 | Stein | June 7, 1960 |

OTHER REFERENCES

Morgan, P.W.: "Interfacial Polycondensation," SPE Journal, June 1959, pp. 485–488.